United States Patent [19]
Andrus

[11] Patent Number: 5,236,347
[45] Date of Patent: Aug. 17, 1993

[54] DRAG REDUCER FOR REAR END OF VEHICLE

[76] Inventor: Paul G. L. Andrus, 650 Dunbar Road, Kitchener, Ontario, Canada, N2M 2X4

[21] Appl. No.: 751,528

[22] Filed: Aug. 29, 1991

[51] Int. Cl.$^5$ .............................................. B62D 35/00
[52] U.S. Cl. ................................................. 296/180.4
[58] Field of Search ................ 296/180.4, 180.5, 180.2

[56] References Cited

U.S. PATENT DOCUMENTS

| | | | |
|---|---|---|---|
| 2,737,411 | 3/1956 | Potter | 296/180.4 |
| 4,553,781 | 11/1985 | Johnson | 216/180.4 |
| 4,601,508 | 7/1986 | Kerian | 296/180.4 |
| 4,702,509 | 10/1987 | Elliott, Sr. | 296/180.4 |
| 4,978,162 | 12/1990 | Labbë | 296/180.4 |

*Primary Examiner*—Robert R. Song

[57] ABSTRACT

A drag reducer to be mounted on the rear face of a truck or other vehicle. It is comprised of an enclosed bag in the shape of a truncated cone with one or more elastic cord(s) encircling it. Air is introduced into the drag reducer upon forward motion of the vehicle via a tube, the open end of which is facing the direction of motion. As air pressure is increased in the drag reducer with increasing forward velocity the tension in the surface of the bag causes the elastic cord(s) to be extended allowing the drag reducer to reach its fully expanded shape. At slow driving speeds the elastic cord(s) contract and prevent the drag reducer from falling or being blown by cross winds over the rear signal lights or license plate and from touching the road in the case of larger more aerodynamically effective drag reducers.

2 Claims, 5 Drawing Sheets

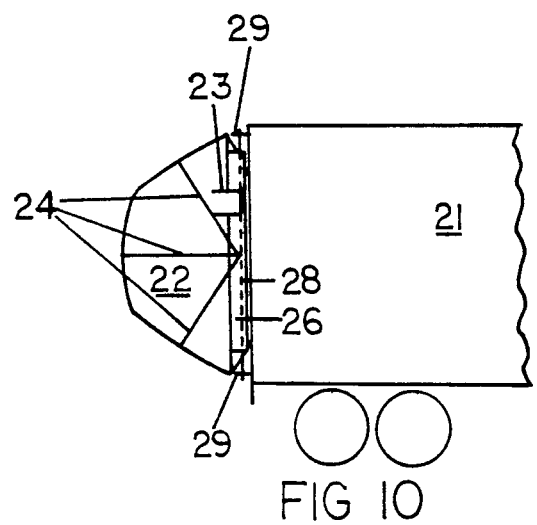
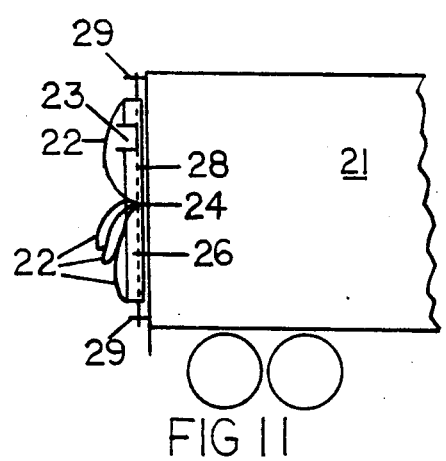

DRAG REDUCER FOR REAR END OF VEHICLE

BACKGROUND OF THE INVENTION

1. Field of the Invention

This invention relates to inflatable drag reducers for the purpose of lessening the partial vacuum that exists behind rectangularly shaped cargo carrying vehicles The addition of such an appendage brings the vehicle closer to the aerodynamically optimal tear drop shape thus significantly reducing aerodynamic drag and fuel consumption. Inflatable rear end drag reducers are superior to rigid versions proposed elsewhere in that they are light, inexpensive and easily collapsible without need of hinges or other moving parts.

2. Prior Art

Labbé(1990) U.S. Pat. No. 4,978,162 shows an automatically inflating drag reducer like the present invention. Labbéhowever, has no means for preventing the drag reducer from falling and/or being blown laterally by cross winds thus obstructing rear signal lights when the pressure inside the drag reducer is insufficient to sustain its inflated shape at slow speeds and stops. The elastic recoil means of the present invention not only prevents tail light obstruction but it allows the drag reducer to be larger and more aerodynamically effectively shaped without having the drag reducer fall on the road let alone obstruct tail lights at slow speeds.

Labbé(1990) air tightly fixes the drag reducer along the periphery of the rear face of the vehicle. Hence the rear face of the vehicle serves as the base of the substantially air tight chamber which is created. One difficulty with attempting to air tightly fix the periphery of the drag reducer to the truck doors is that the doors often have irregularities in their surface due to hinge mounting plates, structural supporting rods and the locking system. In the present invention a fully enclosed bag with flexible base is used to create the required pressurized chamber. This arrangement allows the base of the drag reducer to be mounted easily on the truck with no air sealing requirements (see Labbécol 4, line 18). It also allows for an easily detached mounting means for trucks with upward sliding back doors. The drag reducers, which in these cases must be mounted to the frame of the truck, can easily be removed for access to the door.

Kerian (1986) U.S. Pat. No. 4,601,508 also shows an inflated drag reducer with air being ducted to an open plenum. He mentions in col 4, line 39 that a series of internal bungee cords could be installed for urging the outermost edge of the appendage inwardly toward the doors. It is recognized in the present invention that the most parsimonious manner in which to utilize elastic cords without need for many cords or excessive dimpling of the drag reducer surface when inflated, is for the elastic cord(s) to follow the contour of the drag reducer's surface, preferably circumferentially. Such an arrangement allows the surface tension of the drag reducer to efficiently impart force to and thereby extend the elastic cord(s) so that upon deflation effective recoil is achieved.

SUMMARY OF THE INVENTION

The drag reducer, according to the invention, is comprised of an enclosed flexible air tight bag to be mounted on the rear face of a transport vehicle. The drag reducer is automatically inflated to assume a gradually tapering aerodynamic shape by means of air pressure introduced via an air intake tube, the external end of which faces the direction of forward motion. The air pressure differential between the inside and outside of the drag reducer causes tension to develop in the surface of the drag reducer. The surface tension varies directly with the pressure differential. One or more elastic cord(s) encircle the drag reducer along the contour of its external surface and are expanded by the surface tension to the full circumference of the drag reducer at highway driving speeds. At slow city speeds the surface tension is reduced and the elastic cord(s) contract and raise the limp bag so that it does not hang below the lower level of the back door of the truck, thereby preventing the possibility of covering the lower tail lights or projecting laterally away from the truck.

If the bag is of a larger more gradually tapering conical shape, as in the preferred embodiment of the invention, then the energy savings are significantly more than with a shorter, hemispherically shaped drag reducer. In this case an elastic recoil means is needed not only to keep the drag reducer from covering the lights and license but also to keep it from dragging on the road.

The drag reducer could be made inexpensively of air tight plastic such as vinyl. It may be in the form of two bags permanently attached to each of the two swinging back doors or a single bag which can be readily detached for single upward sliding doors since the drag reducer is not air tightly fixed to the truck.

BRIEF DESCRIPTION OF THE DRAWINGS

FIGS. 7-11 shown a preferred embodiment of the invention at various stages of use.

DETAILED DESCRIPTION OF THE INVENTION

Figure 1:
FIG. 1 is a good airfoil shape.

It has been well established that the optimum airfoil shape is the teardrop shown in FIG. 1 with a rounded front and long gradually tapering tail ending in a point or line. It has also been found that the tip of the tail can be truncated somewhat without increasing drag significantly.

Figure 2:
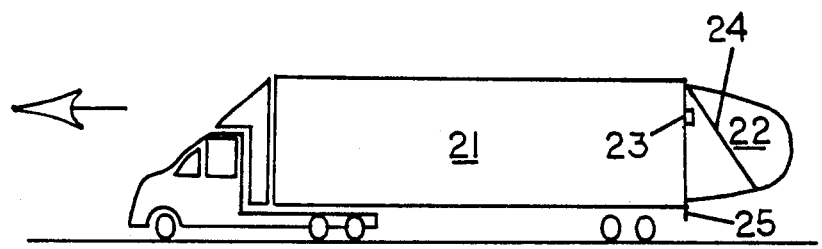
FIG. 2 is a view of a truck moving at highway speed with the present invention attached and low drag streamlined flow past the rear of the vehicle.

FIG. 2 shows a truck[21] moving at highway speed with drag reducer[22] fully inflated due to air pressure provided via air intake tube[23] and elastic recoil means[24] fully extended. The drag reducer[22] has the preferred truncated cone shape, the trailing surface being hemispherical. The lower signal lights[25] are clearly visible from all angles behind the vehicle.

Figure 3:
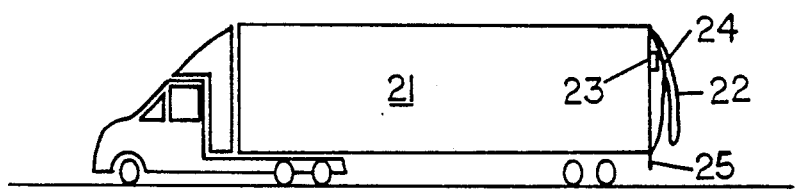
FIG. 3 is a view of a truck at slow speed or stopped with the drag reducer hanging limp.

FIG. 3 shows a truck[21] at slow city speeds or stopped. The drag reducer[22] hangs limply and the elastic recoil means[24] is contracted leaving the signal lights[25] visible even if cross winds should push the drag reducer[22] laterally.

Figure 4:
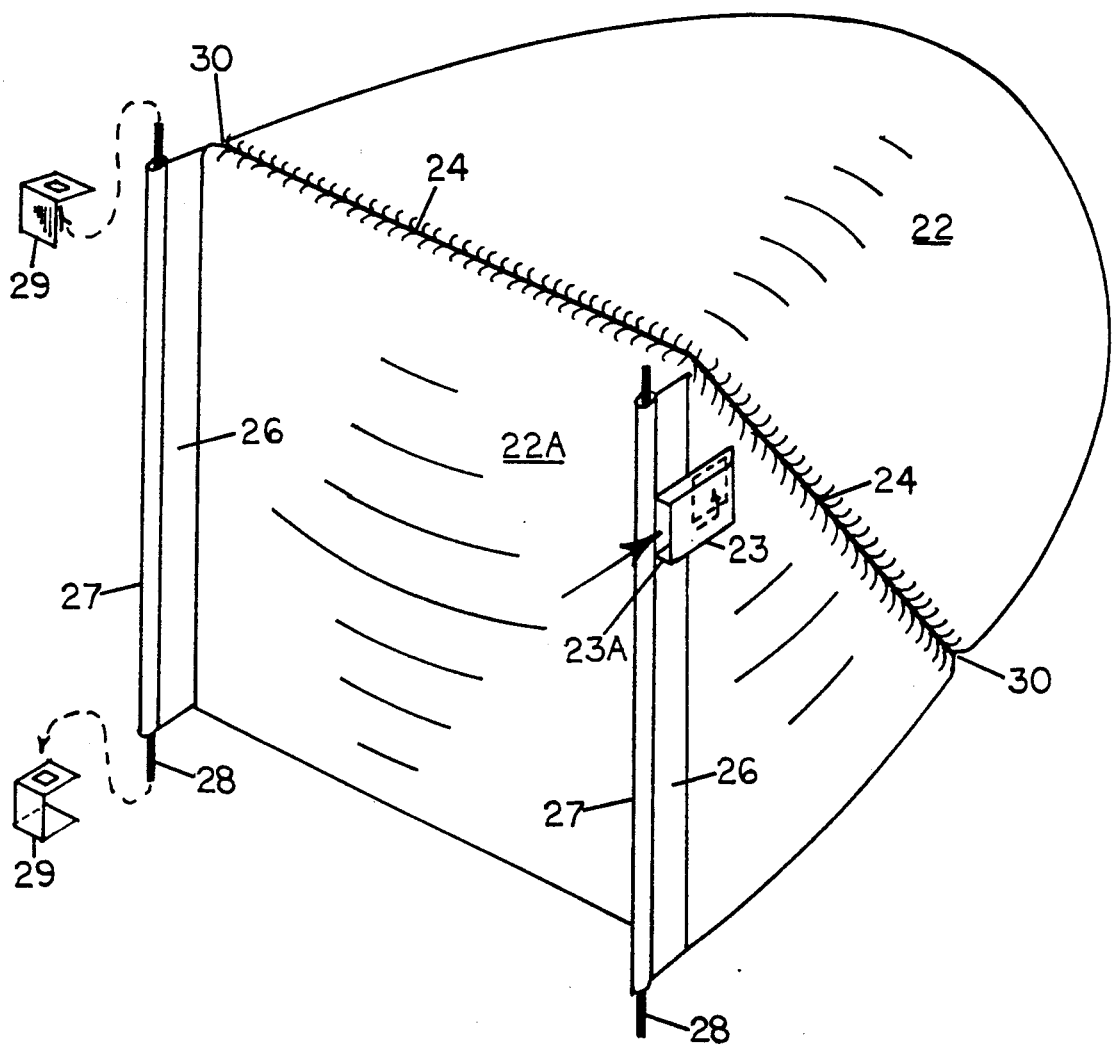
FIG. 4 is a perspective view of an inflated drag reducer.

FIG. 4 shows the base of the drag reducer[224] which is somewhat bowed when the drag reducer[22] is inflated. Laterally disposed flaps[26] and sleeves[27] hold rigid mounting rods[28] which are easily fixed to mounting brackets[29] on the truck (shown schematically here only) from which they can readily be removed if needed as is the case with single upward sliding back doors. The flexible drag reducer base[22A] and simple mounting scheme also eliminates the need to air tightly seal the periphery of the drag reducer[22] to the back of the truck as per Labbé(1990). A crevice[30] encircles the drag reducer[22] for the purpose of housing the elastic recoil means[24]. The air intake tube[23] can be disposed along the side of the drag reducer with its external end[23A] fixed to the side of the truck.

At a rearward wind speed of 90 km/hr the surface tension around the perimeter of the crevice[30] would be about 2 lb/inch which totals over 1000 lb force for the entire crevice[30]. Clearly the available surface tension would be more than ample to extend an elastic recoil means[24] which has adequate tension remaining when significantly contracted to effectively hold the weight of the drag reducer[22] against gravity when the air pressure and thus surface tension is reduced at low speeds.

The elastic recoil means[24] can be any material or structure which is compliant and accumulates tension when stretched such as a bungee cord, helical coil or the like. Ringlets or intermittent sleeves along the bottom of the crevice[30] can be used to keep the elastic recoil means[24] securely in the crevice[30] when the drag reducer[22] is deflated. If the elastic recoil means[24] were ever to become severed or worn to the point of compromising function it could be easily replaced or shortened since it can be accessed from the exterior of the drag reducer[22].

Figure 5:
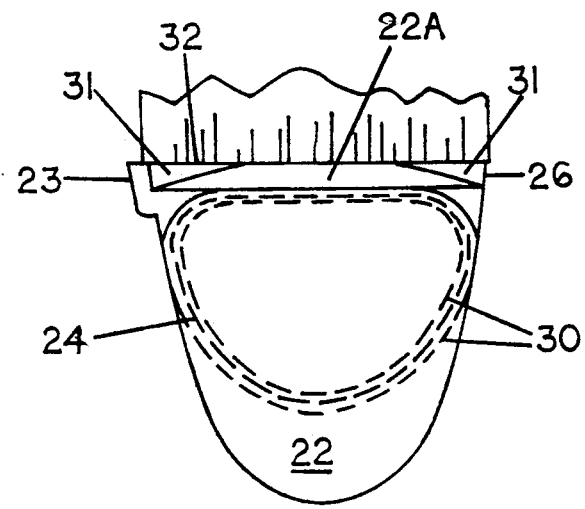
FIG. 5 is a view from above of the rear end of a truck with inflated drag reducer.

FIG. 5 shows the drag reducer[22] fully extended from above. The base of the drag reducer[22A] is bowed under pressure and a space[31] is created between the base of the drag reducer[22A] and the back door(s) of the truck[32]. The partial vacuum that exists in the space[31] between the base of the drag reducer[22A] and the back door(s) of the truck[32] where they are not in intimate contact acts equally and oppositely on the door(s)[32] and the base of the drag reducer[22A]. The net drag remains as that which acts the trailing convex surface of the drag reducer[22] whether the base of the drag reducer[22A] is air tightly fixed to the back of the truck or not.

The concept and structure of air tightly fixing the periphery of the drag reducer to the truck which Labbé(1990) refers to in his first claim col 5, line 8 is not relevant with respect to mounting the side flaps[26] to the truck door(s)[32] in the present invention since the base of the drag reducer[22A] is not fixed to the truck doors[32] at all along their top and bottom edges. FIG. 5 also shows the air intake tube[23], the outline of the crevice[30] and the elastic recoil means[24] at the bottom of the crevice.

Figure 6:
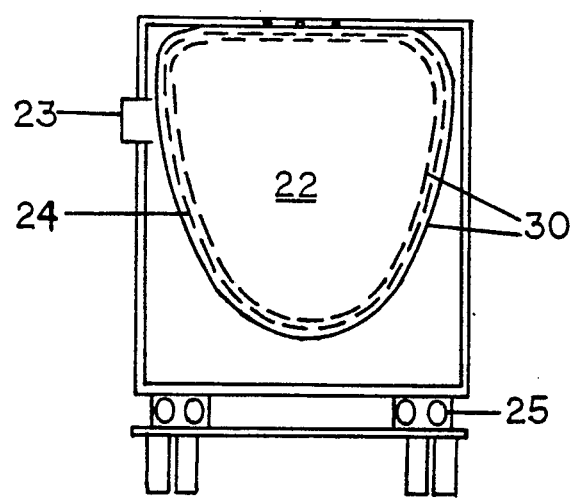
FIG. 6 is a rear view of a truck with inflated drag reducer.

FIG. 6 shows the inflated drag reducer[22] from the rear. The crevice[30], the outline of the elastic recoil means[24] and the air intake tube[23] are also evident.

It is an important object of the present invention to eliminate the possibility of the tail lights[25] being covered even if only under extreme circumstances of a collapsed drag reducer coupled with downward and lateral extension of the limp bag due to cross winds. The drag reducer of Labbé(1990) would obstruct the tail lights[25] regularly when deflated let alone under conditions of downward lateral extension when deflated.

The present invention could employ more elastic cords if more stability were needed. For example, it might be desired to eliminate the possibility that the drag reducer[22] can project under any circumstances laterally away from or upwardly above the truck. With the single elastic cord arrangement shown in FIGS. 2-6 downward projection is eliminated, lateral projection would be minimal in strong cross winds at city driving speeds and upward projection could happen but would be less frequent due to the weight of the drag reducer.

Figure 7:
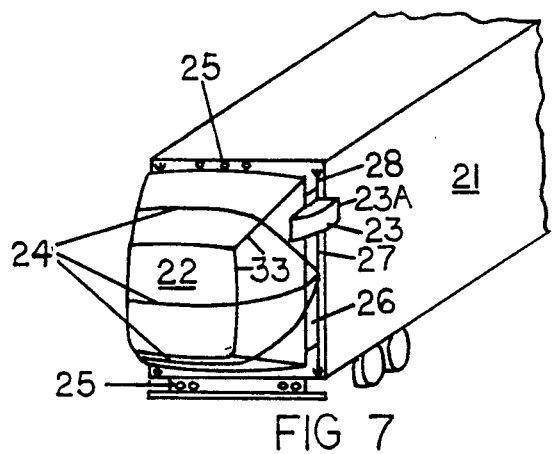

FIG. 7 shows a preferred embodiment inflated at highway speed with three elastic cords 24 which encircle the drag reducer 22 in a semi-circular fashion and are attached at their ends to the rigid mounting rods 28. With this configuration each elastic cord 24 needs to expand only 50-60% of its resting length. Other features shown in FIG. 7 include the truck's tail lights 25, the flaps 26 and sleeves 27 which house the rigid mounting rods 28, and the seams 33 of the drag reducer 22. Note that the flaps 26 are shorter than the drag reducer 22 so that upon contraction the drag reducer 22 is pulled away from the tail lights 25 by the elastic cords 24 (see FIG. 8). Also note that the air intake tube 23 is made of the same flexible material as the drag reducer 22. The external end 23A of the air intake tube 23 has a rigid frame which is an extention of the rigid mounting rod 28. The external end 23A of the air intake tube 23 is smaller and protrudes laterally less than would a rearview mirror. Also the air intake tube 23 is positionned high enough on the truck 21 so as not to interfere with anyone's view of other traffic.

Figure 8:
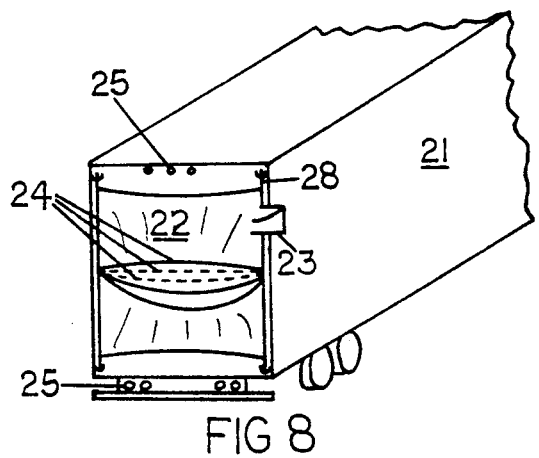

FIG. 8 shown the same drag reducer of FIG. 7 at slow city speeds or stopped in traffic with the elastic cords 24 contracted into a linear configuration. Note that the drag reducer is pulled well away from tail lights 25 and cannot migrate significantly in any direction.

Figure 9:
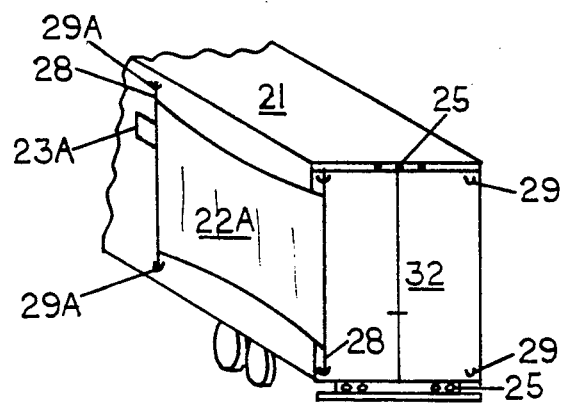

FIG. 9 shows the drag reducer of FIGS. 7 and 8 stopped at the loading dock. The rigid mounting rod 28 with the frame for the external end 23A of the air intake tube 23 is removed from its mounting brackets 29 on the back door 32 of the truck 21 and remounted on another set of mounting brackets 29A on the opposite side of the truck 21 so that the back doors 32 can be fully accessed. The base of the drag reducer 22A is thus exposed. Each elastic cord 24 should have a non-elastic sheath which preserves some tension in the elastic component when the entire cord 24 is relaxed so that the elastic component will have to become very worn before the relaxed length will increase.

FIG. 10 shows a side view of the preferred emodiment while inflated. Mounting brackets 29 support the rigid mounting rods 28 at either end. Additional support for the mounting rod 28 may be required at its mid-point where the elastic cords 24 attach to it.

FIG. 11 is a dies view of the drag reducer 22 when contracted showing all the same features of the preceding drawings. The elastic cords 24 are seen end on in a contracted state at the point where they converge on the mounting rod 28. The drag reducer 22 is folded into small loops.

I claim:

1. An inflatable drag reducer adapted to be mounted behind a vehicle having a substantially flat rear face and lateral faces substantially perpendicular to said rear face, said reducer comprising a large piece of flexible material being substantially air tight in forming the surface of a large plenum and adapted to display a convex surface when fully extended, said reducer having an elastic cord which encircles said drag reducer in a substantially circular or semi-circular fashion and is adapted to follow the contour of said convex surface, whereby, upon inflation of said drag reducer the said elastic cord is extended and upon deflation of said drag reducer the said elastic cord contracts.

2. A drag reducer as recited in claim 1, wherein said material is provided with an opening located adjacent the periphery of said rear face, an air inlet tubular member having one end connected to said opening, the other end of said member adapted to project forwardly on one of the lateral faces of said vehicle, whereby, upon forward movement of the vehicle, air is introduced in said air inlet member and projected into said plenum to inflate said reducer, the projection of air into said plenum being substantially terminated when said reducer is fully extended.

* * * * *